United States Patent
Bastide et al.

(10) Patent No.: US 10,884,724 B2
(45) Date of Patent: *Jan. 5, 2021

(54) SYSTEM AND METHOD FOR CONTEXT AWARE MOBILE APPLICATION INSTALLATION QUEUING

(71) Applicant: International Business Machines Corporation, Armonk, NY (US)

(72) Inventors: Paul R. Bastide, Boxford, MA (US); Lisa Seacat DeLuca, Baltimore, MD (US); Aaron J. Quirk, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/114,583

(22) Filed: Aug. 28, 2018

(65) Prior Publication Data

US 2018/0364998 A1  Dec. 20, 2018

Related U.S. Application Data

(63) Continuation of application No. 14/885,378, filed on Oct. 16, 2015, now Pat. No. 10,133,565.

(51) Int. Cl.
| | |
|---|---|
| *G06F 8/61* | (2018.01) |
| *H04W 4/60* | (2018.01) |
| *H04L 29/08* | (2006.01) |
| *G06F 16/9535* | (2019.01) |
| *G06Q 30/00* | (2012.01) |

(52) U.S. Cl.
CPC ............ *G06F 8/61* (2013.01); *G06F 16/9535* (2019.01); *G06Q 30/00* (2013.01); *H04L 67/34* (2013.01); *H04W 4/60* (2018.02)

(58) Field of Classification Search
CPC ........ G06F 8/61; G06F 16/9535; H04W 4/60; G06Q 30/00; H04L 67/34
See application file for complete search history.

(56) References Cited

U.S. PATENT DOCUMENTS

| | | |
|---|---|---|
| 8,433,620 B2 | 4/2013 | Futty et al. |
| 8,856,168 B2 | 10/2014 | Sayers et al. |
| (Continued) | | |

FOREIGN PATENT DOCUMENTS

| | | |
|---|---|---|
| WO | 2013025382 A1 | 2/2013 |
| WO | 2013116894 A1 | 8/2013 |
| (Continued) | | |

OTHER PUBLICATIONS

List of IBM Patents or Patent Applications Treated as Related; Date Filed: Aug. 28, 2018; 2 pages.
(Continued)

*Primary Examiner* — Daxin Wu
(74) *Attorney, Agent, or Firm* — Cantor Colburn LLP; Alexander Jochym (57) ABSTRACT

According to some embodiments, method for managing an application installation queue on a mobile device is described. The method may include evaluating environmental context information, determining whether the environmental context information corresponds to an application, and queuing the application in the application installation recommendation queue.

17 Claims, 6 Drawing Sheets

(56) References Cited

U.S. PATENT DOCUMENTS

| | | | |
|---|---|---|---|
| 9,111,219 B1 | 8/2015 | Mohla et al. | |
| 9,247,014 B1* | 1/2016 | Rao | G06F 16/907 |
| 9,600,840 B1* | 3/2017 | Pope | G06Q 30/0631 |
| 2012/0042036 A1* | 2/2012 | Lau | H04W 4/60 |
| | | | 709/217 |
| 2012/0072283 A1* | 3/2012 | DeVore | G06Q 30/0251 |
| | | | 705/14.49 |
| 2013/0066821 A1 | 3/2013 | Moore et al. | |
| 2013/0173637 A1 | 7/2013 | Kim et al. | |
| 2013/0268397 A1* | 10/2013 | Mehta | G06F 8/60 |
| | | | 705/26.7 |
| 2013/0346233 A1* | 12/2013 | Caralis | G06Q 30/0631 |
| | | | 705/26.7 |
| 2013/0346234 A1* | 12/2013 | Hendrick | G06Q 30/0631 |
| | | | 705/26.7 |
| 2014/0171052 A1* | 6/2014 | LaMarca | H04W 4/50 |
| | | | 455/418 |
| 2014/0194146 A1* | 7/2014 | Yarvis | H04W 4/029 |
| | | | 455/456.3 |
| 2014/0250433 A1* | 9/2014 | Stekkelpak | G06F 9/44505 |
| | | | 717/176 |
| 2014/0280131 A1* | 9/2014 | Martens | G06F 16/9535 |
| | | | 707/736 |
| 2015/0018019 A1* | 1/2015 | Haro | G01S 5/0284 |
| | | | 455/457 |
| 2015/0355893 A1* | 12/2015 | Luk | G06F 8/62 |
| | | | 717/178 |
| 2016/0092768 A1* | 3/2016 | Patil | G06F 8/61 |
| | | | 706/46 |
| 2016/0188902 A1* | 6/2016 | Jin | G06F 21/6245 |
| | | | 726/28 |
| 2017/0109151 A1 | 4/2017 | Bastide et al. | |

FOREIGN PATENT DOCUMENTS

| | | |
|---|---|---|
| WO | 2013147725 A1 | 10/2013 |
| WO | 2014092776 A1 | 6/2014 |

OTHER PUBLICATIONS

Droid-Life.com, "Recommended for You", http://www.droid-life.com/2012/08/30/recommended-for-you-section-appears-in-google-play-store/; 3 pages.

M. Bohmer, et al.,"Contextualizing Mobile Applications for Context-aware Recommendation", ResearchGate, Jan. 2010, pp. 1-4.

* cited by examiner

SYSTEM AND METHOD FOR CONTEXT AWARE MOBILE APPLICATION INSTALLATION QUEUING

DOMESTIC PRIORITY

This application is a continuation of U.S. application Ser. No. 14/885,378, titled "SYSTEM AND METHOD FOR CONTEXT AWARE MOBILE APPLICATION INSTALLATION QUEUING" filed Oct. 16, 2015, the contents of which are incorporated by reference herein in its entirety.

BACKGROUND

The present disclosure relates to mobile application installation, and more specifically, to context aware mobile application installation queuing.

Mobile devices users may travel to locations or experience situations in which a mobile device can be discovered by an advertising entity. For example, a mobile device user may enter a business that recommendations a download of a mobile application for use in connection with its business enterprise. Some business may share or advertise their mobile application with mobile device user in the general vicinity, and enable installation of that application the user's device. Additionally, there are ways for peer-to-peer broadcast of applications between mobile devices, including near field communication (NFC) or Bluetooth low energy (BLE) enabled communication.

With any of the above advertisement channels, the user may not notice the advertisement or application suggestion at the time that the device is in the vicinity of the advertiser. Hence, the knowledge or existence of the application may be missed by the user. Furthermore, the user may not have time or desire to install the mobile application when the advertisement occurs. For example, if the user is shopping in an electronics store and using their smart phone, the user may find it distracting to receive and manage an advertised application installation recommendation while completing a transaction with the cashier. Accordingly, a mobile device user can lose track of suggested or advertised applications. This may be undesirable for vendors wanting an advertising presence on local smart devices. Mobile device users may also miss valuable opportunities to interact with businesses that they use, and may miss value-added features provided by the recommended applications. It may be advantageous to provide context aware tracking and management of recommendations for mobile device applications encountered by mobile device users.

SUMMARY

According to some embodiments, a method for managing an application installation queue on a mobile device is described. The method may include evaluating environmental context information, determining whether the environmental context information corresponds to an application, and queuing the application in the application installation recommendation queue.

According to other embodiments, a device for managing an application installation queue is described. The device may include a processor configured to evaluate environmental context information, determine whether the environmental context information corresponds to an application, and queue the application in the application installation recommendation queue.

In yet other embodiments, a non-transitory computer-readable storage medium is described. The storage medium may store instructions executable to perform a method for managing an application installation queue on a mobile device. The method may include evaluating environmental context information, determining whether the environmental context information corresponds to an application, and queuing the application in the application installation recommendation queue.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
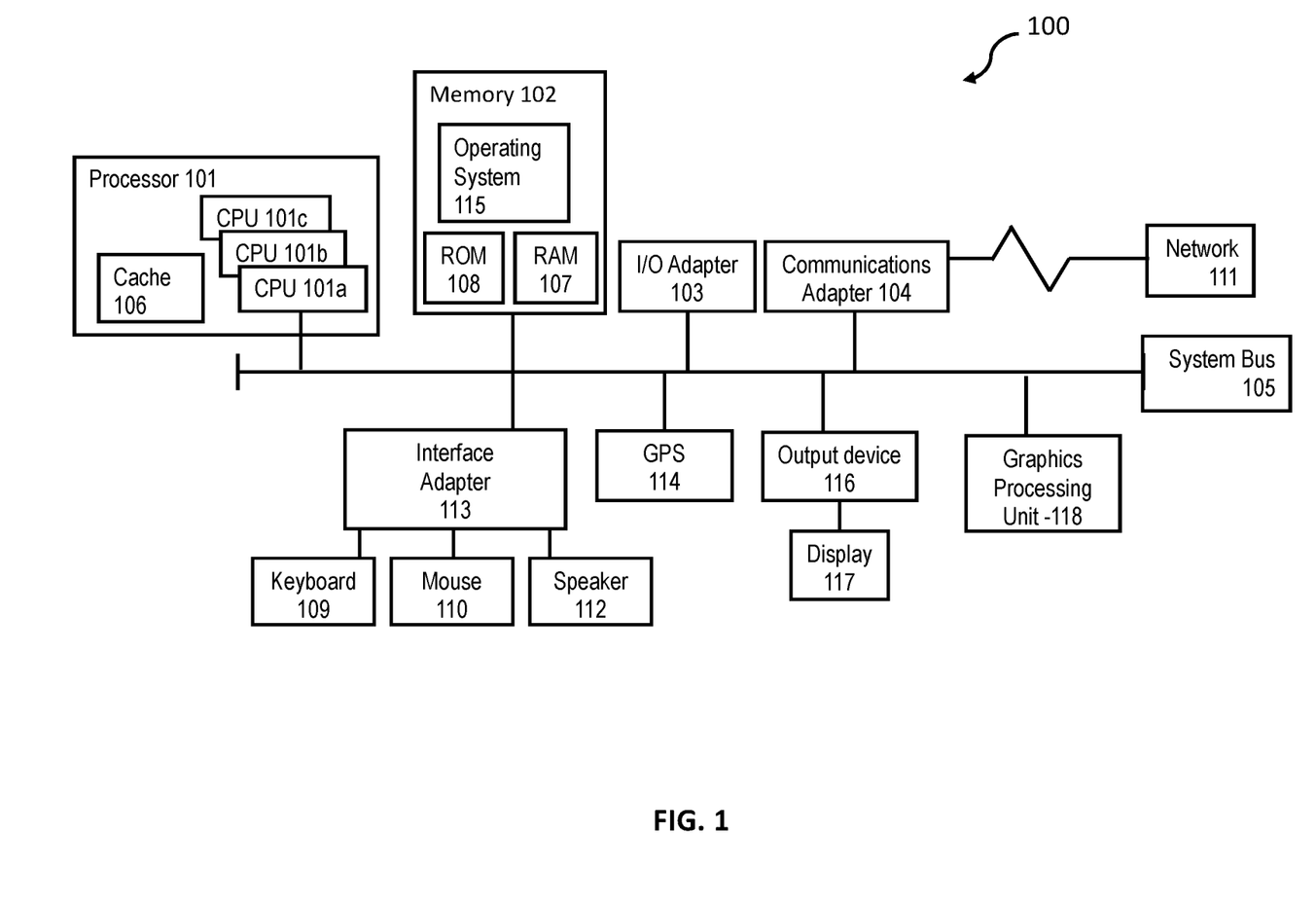
FIG. 1 illustrates a block diagram of a computer system for use in practicing the teachings herein.

FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input and/or output (I/O) adaptors 103, that may be communicatively coupled via a local system bus 105. Memory 102 may be operatively coupled to one or more internal or external memory devices (e.g., external memory devices (not shown)). Communications adaptor 104 may be operatively connect computer 100 to one or more networks 111. System bus 105 may also connect one or more user interfaces via interface adaptor 113. Interface adaptor 113 may connect a plurality of user interfaces to computer 100 including, for example, a keyboard 109, a mouse 110, a speaker 112, etc. System bus 105 may also connect a GPS receiver 114, output device 116 and display 117 to processor 101. Processor 101 may also be operatively connected to a graphics processing unit 118.

Processor 101 may be a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 101, a semiconductor based microprocessor (in the form of a microchip or chip set), a macroprocessor, or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The memory cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 115. Operating system 110 can control the execution of other computer programs and provides scheduling, input-output control, file and data management, memory management, and communication control and related services.

Input/output adaptor 103 can be, for example but not limited to, one or more buses or other wired or wireless connections, as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 113 may be configured to operatively connect one or more I/O devices to computer 100. For example, interface adaptor 113 may connect a conventional keyboard 109 and mouse 110. Other output devices, e.g., speaker 112, may be operatively connected to interface adaptor 113. Other output devices may also be included, although not shown. For example, devices may include but are not limited to a printer, a scanner, microphone, and/or the like. Finally, the I/O devices connectable to interface adaptor 113 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

I/O adaptor 103 may also operatively connect to and/or embody an antenna, keyboard, mouse, joystick, (infrared) remote control, camera, card reader, fax machine, dongle, biometric reader, microphone, touch screen, touchpad, trackball, sensor (e.g., accelerometer, light sensor, gyroscope, proximity sensor, or the like), stylus, scanner, storage device, transceiver, video device/source, visors, etc. I/O adaptor 103 may connect a printer, fax machine, video display (e.g., cathode ray tube (CRT), liquid crystal display (LCD), light-emitting diode (LED), plasma, or the like), audio speaker, etc. In some embodiments, I/O adaptor 103 may include a transceiver that may be disposed in connection with processor 101. The transceiver may facilitate various types of wireless transmission or reception. For example, the transceiver may include an antenna operatively connected to a transceiver chip (e.g., Texas Instruments WiLink, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.).

According to some embodiments, computer 100 may include a GPS 114 configured to provide positioning information to processor 101.

Computer 100 can further include output device 116 coupled to one or more displays 117. In an exemplary embodiment, computer 100 can further include communications adaptor 104 for coupling to a network 111.

Network 111 can be an IP-based network for communication between computer 100 and any external device. Network 111 transmits and receives data between computer 100 and external systems. In an exemplary embodiment, network 111 can be a managed IP network administered by a service provider. Network 111 may be implemented in a wireless fashion, e.g., using wireless protocols and technologies, such as WiFi, WiMax, etc. Network 111 can also be a packet-switched network such as a local area network, wide area network, metropolitan area network, Internet network, or other similar type of network environment. The network 111 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in memory 102 may further include a basic input output system (BIOS) (omitted for simplicity). The BIOS can be a set of essential routines that initialize and test hardware at startup, start operating system 115, and support the transfer of data among the operatively connected hardware devices. The BIOS can be stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

Figure 2:
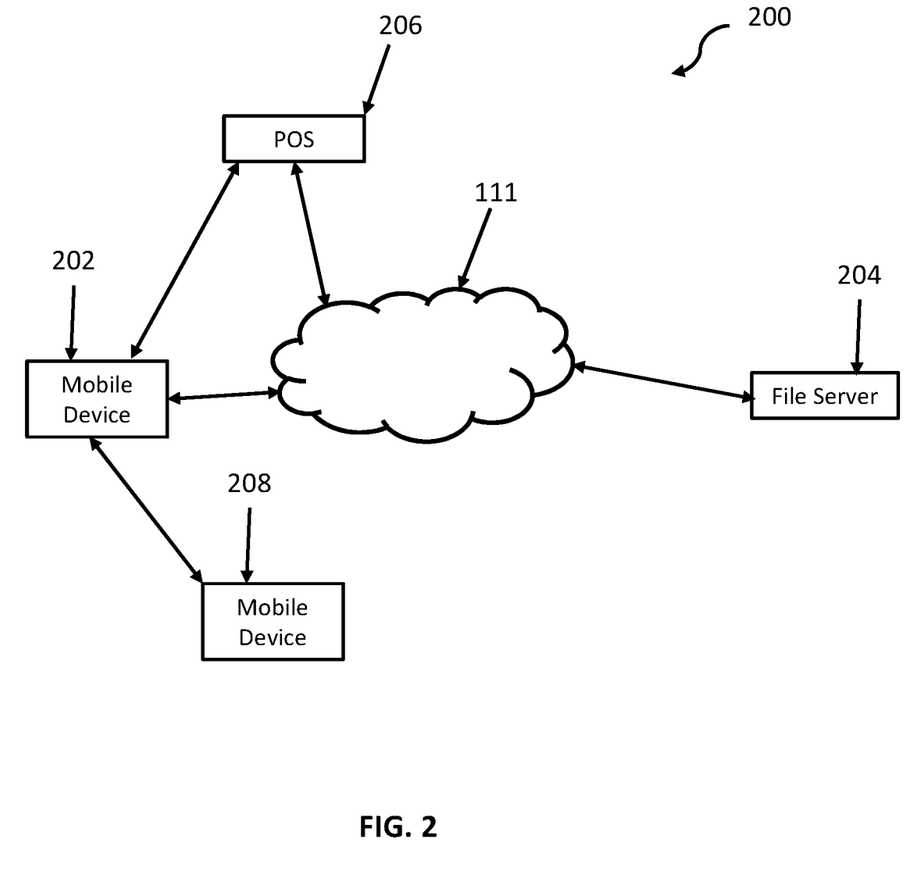
FIG. 2 depicts a computing environment for managing an application installation queue on a mobile device in accordance with an exemplary embodiment.

Referring now to FIG. 2, a computing environment 200 for managing an application installation queue on a mobile device is described, in accordance with an exemplary embodiment. Some business locations are equipped to broadcast an installation recommendation for mobile device users to download a mobile application in connection with a particular business, service, product, etc. For example, a smartphone user may enter a brick and mortar electronics store where the store broadcasts an application recommendation for their proprietary mobile application (hereafter "app" and "application" may be used interchangeably). The mobile app may include multimedia messages, for example, providing time sensitive discounts or promotions to the mobile device user. As another example, the business may partner with an associated website and may cross-promote the website's mobile app. Although many scenarios are contemplated herein, those skilled in the art appreciate that a mobile app may serve many purposes.

When a mobile device encounters an installation recommendation for installation of a mobile app, the mobile device may prompt the user to take some action at the time the recommendation is made. For example, if a mobile device user is at a restaurant, the user may receive a notification indicating a recommendation to install that restaurant's mobile app. However the mobile device user may not be inclined to immediately consider the recommendation and/or install the app. The restaurant may lose an opportunity for a potentially interested customer's interaction with their app due to inconvenient timing, or for other reasons that may cause the device user to ignore the installation recommendation.

Referring again to FIG. 2, according to some embodiments mobile device 202 may be in communication with one or more other devices, including, e.g., a point of sale (POS) device 206, a file server 204, and/or one or more other mobile devices 208.

In some aspects, one or more devices may be configured to broadcast an installation recommendation for installation of a mobile app. For example, POS 206 and file server 204 may operate in connection with a business or other establishment for the purpose of recommending mobile application installations to mobile devices in the general proximity. In one embodiment, POS 206 may be a checkout register that broadcasts recommendations for application installation. In other aspects, file server 204 may be a computer configured to broadcast application installations in a specific geographic region (e.g., inside of a store). Any one or more of POS 206, file server 204, and mobile device 208 may broadcast an installation recommendation for an application. The devices depicted in computing environment 200 are exemplary only, and may include any number and type of suitably configured broadcasting devices.

An installation recommendation for an application may include least one broadcasted signal including information indicative of a mobile application, where the mobile application is not currently installed on the mobile device. The broadcast signal may be a broadcast link, NFC signal, BLE signal, RFID signal, a telecommunication signal, a text message, a notice, an alert, a sound, an executable file, or some other signal indicative of an available mobile application installation. According to some embodiments, the recommendation may suggest installation of an application that has some contextual relationship with an activity, location, product, service, etc., of a user having mobile device 202. For example, file server 204 may suggest an installation recommendation for a wine rating and information application if it detects that a mobile device user has purchased a bottle of wine, or has entered into the wine section of a beverage vendor.

Figure 3:
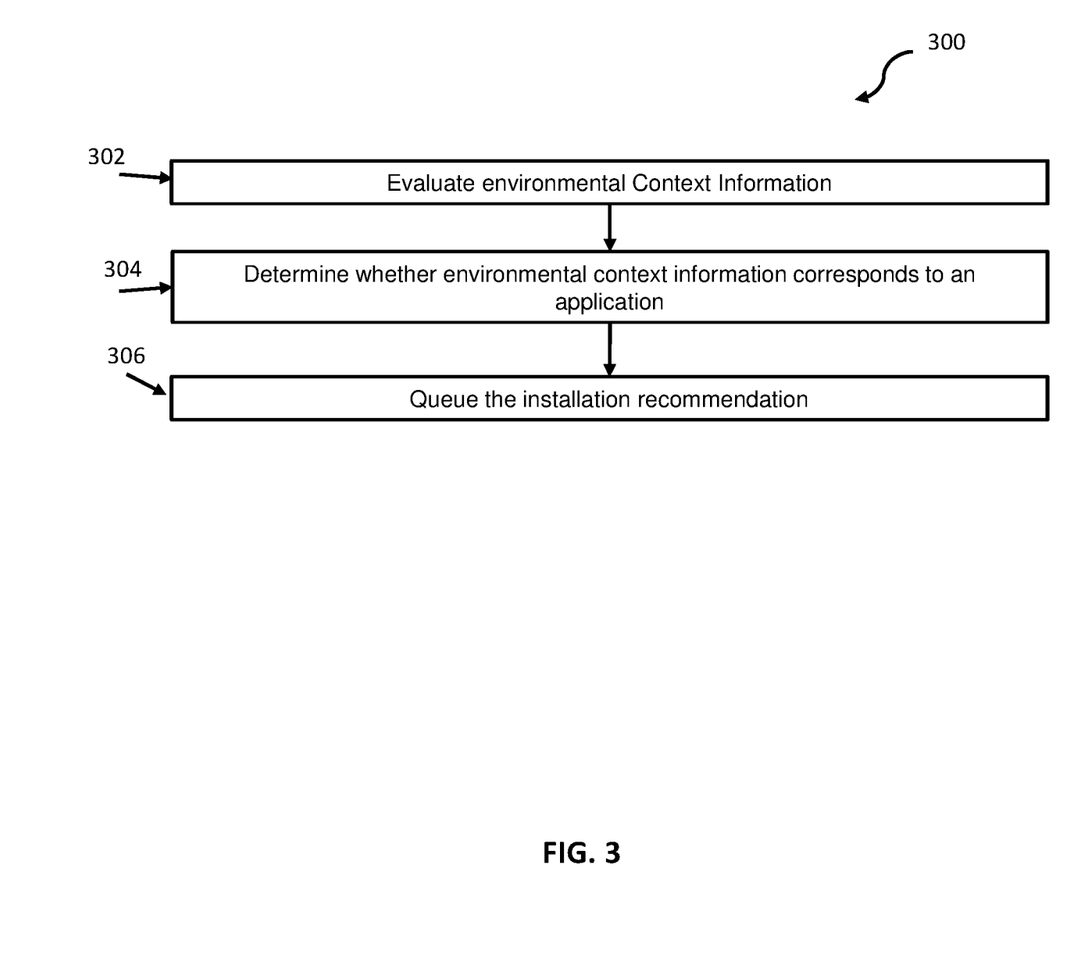
FIG. 3 depicts a flow diagram of a method for managing an application installation queue on a mobile device in accordance with an exemplary embodiment.

In some instances, a mobile device (e.g., mobile device 202) may encounter a plurality of installation recommendations over time. The recommendations may accumulate in the mobile device waiting for some action from the device user. FIG. 3 depicts a flow diagram of a method 300 for managing an application installation queue on a mobile device in accordance with an exemplary embodiment. A mobile application installation queue, according to some embodiments, may include one or more recommendations for mobile apps not currently installed on a mobile device. The apps can be organized in some ordered way to provide for later review installation or deletion by the user.

Referring now to FIG. 3, according to some embodiments, mobile device 202 may generally manage an application installation queue by evaluating environmental context information, as shown at block 302, determining whether the environmental context information corresponds to an application, as shown at block 304, and queuing the recommendation, as shown at block 306.

Figure 4:
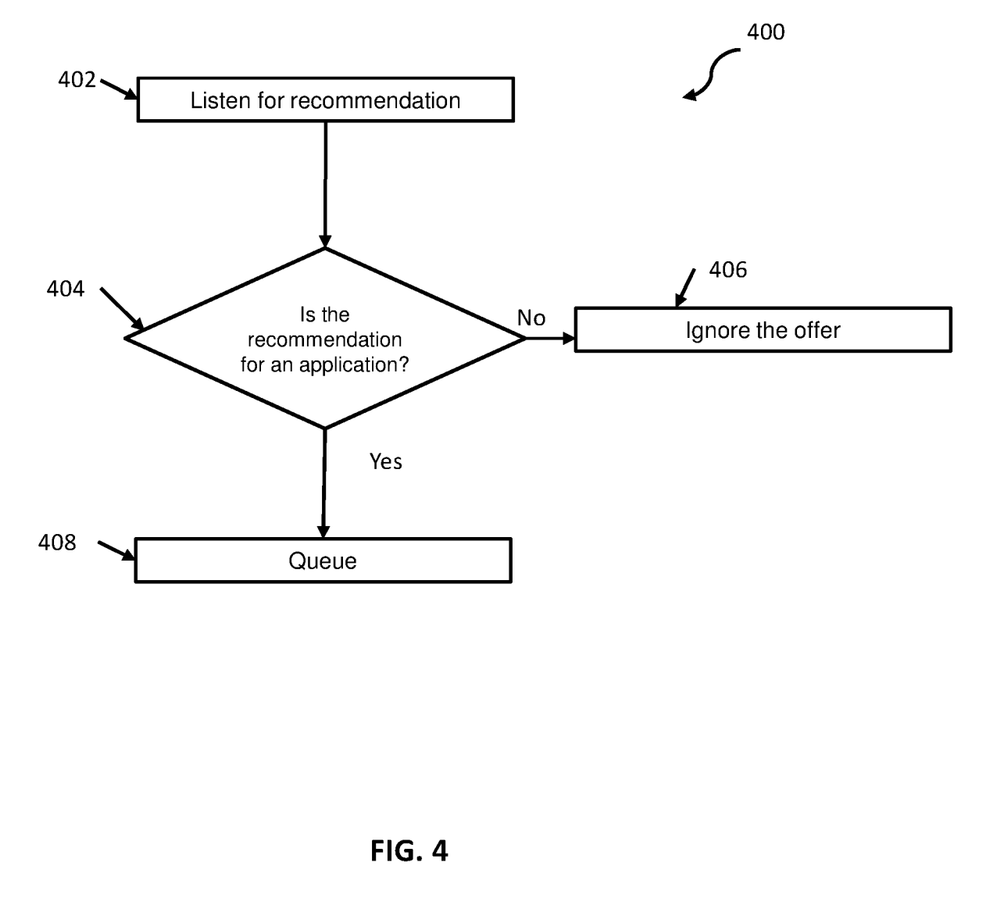
FIG. 4 depicts a flow diagram of a method for identifying an installation recommendation for an application installation in accordance with an exemplary embodiment.

Considering each block of FIG. 3 in more detail, at block 302 mobile device 202 may evaluate environmental context information. Mobile device 202 may encounter many recommendations throughout the course of a day, a week, etc. FIG. 4 depicts a flow diagram of a method 400 for identifying an installation recommendation for an application installation in accordance with an exemplary embodiment.

Referring now to FIG. 4, as shown at block 402 mobile device 202 may listen for a recommendation for an application installation. In some embodiments, over time, mobile device 202 may encounter many recommendations for mobile applications. As shown at decision block 404 mobile device 202 may determine whether a particular recommendation is directed to that particular mobile device 202.

For example, at block 404, a user (not shown) may be walking past a plurality of stores along an avenue while carrying mobile device 202. Mobile device 202 may receive an installation recommendation broadcast from a nearby file server after passing the first store. As mobile device 202 approaches a second store, mobile device 202 may receive another recommendation from the second store, etc., until the device has accumulated a large quantity of application installation recommendations that may or may not be applicable to that particular user. In some aspects, at block 404, mobile device 202 may determine, after the receipt of each recommendation, whether the recommendation was a broadcasted recommendation for an application, and/or whether the recommendation was directed to that particular mobile device 202. Device 202 may make this determination based on the environmental context clues learned from the operational environment and from the past actions of device 202.

As shown at block 404, mobile device 202 may evaluate a plurality of clues in connection with the environmental context in which a particular recommendation was extended, and determine, based on the environmental context information, whether the recommendation was meant for that device. Environmental context information may include, for example, a location, a time, a weather condition, an ambient noise level, an available bandwidth, a computing cost of an acquisition of the recommendation, a business identification, and/or an estimated time to install the recommended application installation.

In one embodiment, mobile device 202 may access GPS receiver 114 (installed on mobile device 202) to determine that mobile device 202 is simply walking past an establishment (the presumed recommendation of the mobile app), or whether mobile device 200 has meaningfully interacted with that establishment recommending the app. For example, mobile device 202 may determine, based on the GPS information and time information, that it is receiving the broadcasted recommendation for app installation as a coincidence of being near the broadcaster, where the determination is based on the location, the rate of movement (indicative of a mode of travel), and the lack of stops while traversing the broadcasting source.

According to some embodiments, as shown at block 406 mobile device 202 may optionally ignore the one or more recommendations. In some aspects, it may not be advantageous for mobile device 202 to accumulate an abundance of unneeded recommendations in the application installation queue (which is discussed hereafter in greater detail with respect to FIG. 5). In some aspects, inapplicable recommendations (that may not pertain to actual installation recommendations) may be annoying or confusing for a device user receiving the recommendations and/or may be inconvenient to manage. By examining the user's history with respect to a particular app, the recommendation status may provide valuable insight for determining a best course of action for any one app recommending. Accordingly, as shown at block 408, mobile device 202 may queue the installation recommendation based on whether device 202 has previously encountered the recommendation, and how mobile device 202 has treated previous similar recommendations.

Figure 5:
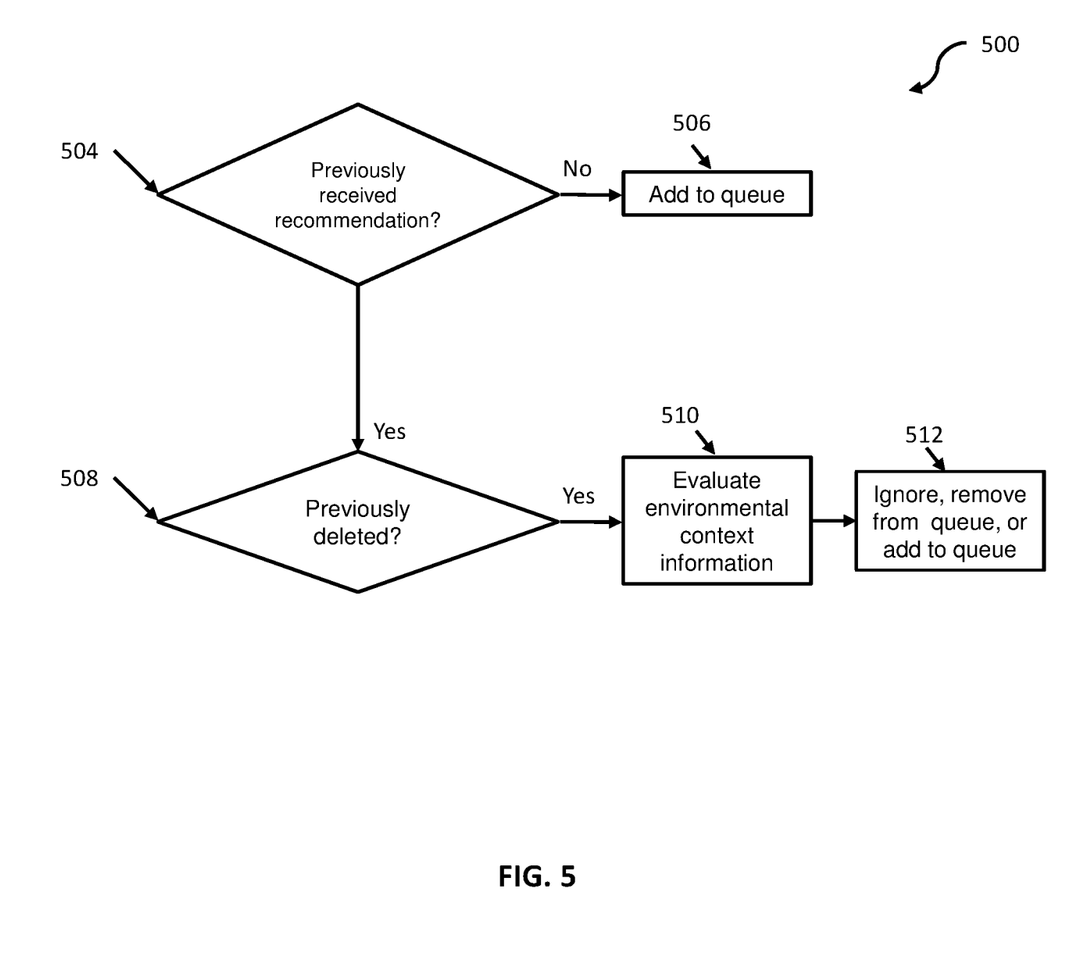
FIG. 5 depicts a flow diagram of a method for determining an installation recommendation status in accordance with an exemplary embodiment.

Considering now the method 500 for determining an installation recommendation status as depicted in FIG. 5, mobile device 202 may determine an installation recommendation status for the broadcasted recommendation. An installation recommendation status may include information indicative of whether an installation recommendation has been received by mobile device 202 at a previous time, and whether mobile device 202 had previously installed and/or deleted the recommendation. In some aspects, as shown at decision block 504 mobile device 202 may determine whether mobile device 202 has previously received and/or installed the recommendation. In some embodiments, mobile device 202 may access memory (e.g., memory 102) to determine whether mobile device 202 has previously received the recommendation. In other aspects, mobile device 202 may send a request to a remote file server (e.g., file server 204) that may store information indicative of previous recommendations received.

Figure 6:
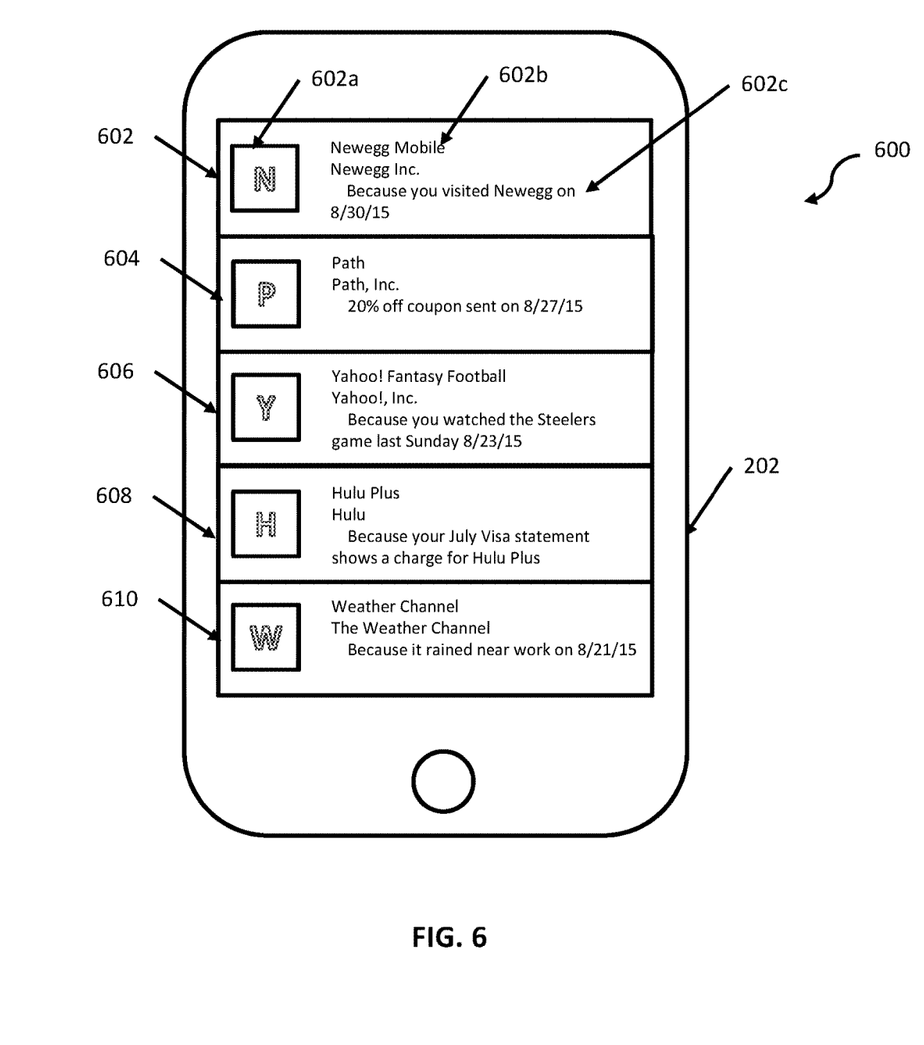
FIG. 6 depicts a user interface for managing an application installation queue accordance with an exemplary embodiment.

In some aspects, mobile device 202 may have never received that particular recommendation. At block 506, mobile device 202 may add the recommendation to an application installation queue on the device. FIG. 6 depicts an application installation queue 600 (hereafter "application queue 600"), according to some exemplary embodiments.

Considering now FIG. 6, application queue 600 may include a plurality of application installation recommendations 602-610. In some aspects, an application installation recommendation (hereafter "install recommendation") may include an application logo 602a, an application heading or title 602b, and an environmental context 602c.

An environmental context (e.g., environmental context 602c) may include information indicative of a particular reason that mobile device 202 is queuing the install recommendation (e.g., saving the installation recommendation on mobile device 202 in a particular order respective to other saved installation recommendations). An application installation queue (e.g., application queue 600) may include an ordered list of a plurality of recommendations (e.g., recommendations 602-610) for an application installation.

For example, considering install recommendation 602, environmental context 602c is indicative that recommendation 602 is saved on device 202. As depicted in FIG. 6, install recommendation 602 may advise that, "Because you (an exemplary user of mobile device 202) visited Newegg on Aug. 30, 2015". In some aspects, an environmental context can be indicative of how or why an extended recommendation for an application installation is queued on the device. According to some embodiments, mobile device 202 may evaluate environmental context information (e.g., date, time, weather condition, etc.) while evaluating environmental context 602c. Although application installation queue 600 shows only a few recommendations having environmental context, installation queue 600 is exemplary only. It is contemplated that installation queue 600 may include any number of contexts derivable from the environmental context information available to mobile device 202.

Referring again to FIG. 5, at decision block 504, mobile device 202 may determine that the recommendation has not been previously received. In some aspects, mobile device 202 may add the recommendation to application installation queue 600. If mobile device 202 determines that the recommendation was previously received, as shown at decision block 504, the mobile device 202 may then determine whether the recommendation was previously received and installed, then deleted from mobile device 202, as shown at decision block 508.

For example, if a user is recommended a Colorado Rockies Baseball app only while attending Rockies' baseball games, a user may install the app for use at the game, and then later delete the app from her mobile device at the end of the game. In this example, as shown at block 510, the mobile device 202 may evaluate environmental context information (e.g., time information, date information, GPS information, etc.) in connection with previous recommendation installations (installation history), and determine that the user usually deletes this app after leaving Rockies' games. Accordingly, as shown at block 512, mobile device 202 may ignore the recommendation, remove the recommendation from application installation queue 600, or add the recommendation to application installation 600. In some aspects, mobile device 202 may rearrange the recommendation queue by adding the recommendation to the top of the queue (e.g., in first position before recommendation 602).

According to another embodiment, mobile device 202 may rearrange application installation queue 600 by removing the recommendation from application installation queue 600.

In other aspects, mobile device 202 may request user input and rearrange application installation queue 600 based on an input received from the user. For example, mobile device 202 may display a visual prompt on output device 116 requesting user feedback on the desirability of baseball-related apps on the first Saturday of the month, when that particular user has historically installed then deleted the app.

In other embodiments, mobile device 202 may rearrange application installation queue 600 automatically based on a predetermined list of user preferences. For example, mobile device 202 may prompt a user for input regarding the types of activities observed by mobile device 202 during each situational context (e.g., getting a car wash, buying wine, attending a baseball game), and the associated application recommendations received during each respective situational context (e.g., a car wash coupon app, a wine rating and information app, a baseball stadium app, etc.). Mobile device 202 may receive the user input, save each predetermined preferences in the predetermined list of preferences, and automatically rearrange application installation based on the preferences.

In other aspects, mobile device 202 may be configured to preemptively install a previously installed app based on environmental context information. For example, mobile device 202 may determine, based on environmental context information and the installation history, that a user of mobile device 202 would find it convenient to automatically install an application at a particular date, time, location, weather condition, etc. Accordingly, mobile device 202 may automatically install the particular installation recommendation.

According to other embodiments, mobile device 202 may determine, based on user input, a preferred order for each recommendation in recommendation installation queue 600. For example, mobile device 202 may be configured to receive tactile input by sliding, with a finger gesture, etc., a particular recommendation up or down application installation queue 600.

In yet other exemplary embodiments, mobile device 202 may include a social media module configured to share preferred app recommendations with one or more other mobile devices (e.g., mobile device 208).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing an application installation recommendation queue on a mobile device comprising one or more processors, the method comprising:
   receiving, by the mobile device, a broadcast signal from a point of sale (POS) device, wherein the signal is broadcasted within a geographic region, wherein the broadcast signal includes an installation recommendation that is associated with an application program;
   obtaining, by the mobile device, environmental context information comprising GPS information and time information of the mobile device;
   evaluating, by the mobile device, the environmental context information to determine whether the installation recommendation is directed to the mobile device, wherein determining whether the installation recommendation is directed to the mobile device includes determining, by the mobile device based on the GPS information and time information, whether the mobile device is receiving the broadcasted installation recommendation as a coincidence of being within a predetermined distance to the POS, wherein the determination of whether the mobile device is receiving the broadcasted installation recommendation as a coincidence of being within a predetermined distance to the POS is based on a determination of whether the mobile device is merely walking past an establishment associated with the POS device or whether the mobile device has meaningfully interacted with the establishment based on at least one of a rate of movement of the mobile device or lack of stops of the mobile device while traversing within the geographic region;
   in response to determining that the device is within the geographic region, determining, by the mobile device, based on the environmental context information and an installation history, whether the application associated with the installation recommendation corresponds to an application that should be recommended for installation on the mobile device; and
   in response to determining that the application associated with the installation recommendation corresponds to an application that should be recommended for installation on the mobile device and that the application is not associated with an application installed on the mobile device, queuing, by the mobile device, the application associated with the installation recommendation in the application installation recommendation queue,
   wherein the installation history is indicative of whether the application was previously installed on the mobile device while the mobile device was at the geographic location, and indicative of whether the application was previously deleted from the mobile device after completion of an event or transaction associated with the mobile device being at the geographic location.

2. The method of claim 1, wherein evaluating environmental context information comprises generating metadata responsive to determining that the mobile device has received the installation recommendation,
   wherein the metadata is based on the installation history and indicative of at least one of: the location of the mobile device, a time, a weather condition, an ambient noise level, an available bandwidth, a computing cost of an acquisition of the installation recommendation, a business identification, and an estimated time to install the recommended application.

3. The method of claim 1, wherein the application installation queue comprises an ordered list of a plurality of installation recommendations for an application installation, wherein the method further includes rearranging the installation queue.

4. The method of claim 3, wherein rearranging the installation queue comprises installing one or more application installation recommendations from the ordered list of the plurality of application installation recommendations.

5. The method of claim 3, wherein rearranging the installation recommendation queue comprises removing one or more application installation recommendations from the queue.

6. The method of claim 3, wherein rearranging the queue comprises requesting user input, receiving a user input, and rearranging the queue based on the received user input.

7. The method of claim 3, wherein the queue is rearranged automatically based on a predetermined list of user preferences.

8. A mobile device for managing an application installation queue, comprising a processor configured to:
   receive, by the mobile device, a broadcast signal from a point of sale (POS) device, wherein the signal is broadcasted within a geographic region, wherein the broadcast signal includes an installation recommendation that is associated with an application program;
   obtain, by the mobile device, environmental context information comprising GPS information and time information of the mobile device;
   evaluate, by the mobile device, the environmental context information to determine whether the installation recommendation is directed to the mobile device, wherein determining whether the installation recommendation is directed to the mobile device includes determining, by the mobile device based on the GPS information and time information, whether the mobile device is receiving the broadcasted installation recommendation as a coincidence of being within a predetermined distance to the POS, wherein the determination of whether the mobile device is receiving the broadcasted installation recommendation as a coincidence of being within a predetermined distance to the POS is based on a determination of whether the mobile device is merely walking past an establishment associated with the POS device or whether the mobile device has meaningfully interacted with the establishment based on at least one of a rate of movement of the mobile device or lack of stops of the mobile device while traversing within the geographic region;
   in response to determining that the device is within the geographic region, determine, by the mobile device, based on the environmental context information and an installation history, whether the application associated with the installation recommendation corresponds to an application that should be recommended for installation on the mobile device; and in response to determining that the application associated with the installation recommendation corresponds to an application that should be recommended for installation on the mobile device and that the application is not associated with an application installed on the mobile device, queue, by the mobile device, the application associated with the installation recommendation in the application installation recommendation queue, wherein the installation history is indicative of whether the application was previously installed on the mobile device while the mobile device was at the geographic location, and indicative of whether the application was previously deleted from the mobile device after completion of an event or transaction associated with the mobile device being at the geographic location.

9. The device of claim 8, wherein the processor is further configured to:

generate metadata responsive to determining that the mobile device has received the installation recommendation;

wherein the metadata is based on the installation history and indicative of at least one of: the location of the mobile device, a time, a weather condition, an ambient noise level, an available bandwidth, a computing cost of an acquisition of the installation recommendation, a business identification, and an estimated time to install the recommended application; and evaluate environmental context information.

10. The device of claim 8, wherein the application installation queue comprises an ordered list of a plurality of installation recommendations for an application installation.

11. The device of claim 10, wherein the processor is further configured to rearrange the installation recommendation queue by installing one or more installation recommendations from the ordered list of the plurality of installation recommendations.

12. The device of claim 10, wherein the processor is further configured to rearrange the installation recommendation queue by removing one or more installation recommendations from the installation recommendation queue.

13. The device of claim 10, wherein the processor is further configured to rearrange the queue based on a predetermined list of user preferences.

14. A non-transitory computer-readable storage medium storing instructions executable to perform a method for managing an application installation queue on a mobile device, the method comprising:

receiving, by the mobile device, a broadcast signal from a point of sale (POS) device, wherein the signal is broadcasted within a geographic region, wherein the broadcast signal includes an installation recommendation that is associated with an application program;

obtaining, by the mobile device, environmental context information comprising GPS information and time information of the mobile device;

evaluating, by the mobile device, the environmental context information to determine whether the installation recommendation is directed to the mobile device, wherein determining whether the installation recommendation is directed to the mobile device includes determining, by the mobile device based on the GPS information and time information, whether the mobile device is receiving the broadcasted installation recommendation as a coincidence of being within a predetermined distance to the POS, wherein the determination of whether the mobile device is receiving the broadcasted installation recommendation as a coincidence of being within a predetermined distance to the POS is based on a determination of whether the mobile device is merely walking past an establishment associated with the POS device or whether the mobile device has meaningfully interacted with the establishment based on at least one of a rate of movement of the mobile device or lack of stops of the mobile device while traversing within the geographic region;

in response to determining that the device is within the geographic region, determining, by the mobile device, based on the environmental context information and an installation history, whether the application associated with the installation recommendation corresponds to an application that should be recommended for installation on the mobile device; and in response to determining that the application associated with the installation recommendation corresponds to an application that should be recommended for installation on the mobile device and that the application is not associated with an application installed on the mobile device, queuing, by the mobile device, the application associated with the installation recommendation in the application installation recommendation queue, wherein the installation history is indicative of whether the application was previously installed on the mobile device while the mobile device was at the geographic location, and indicative of whether the application was previously deleted from the mobile device after completion of an event or transaction associated with the mobile device being at the geographic location.

15. The non-transitory computer-readable storage medium of claim 14, wherein evaluating environmental context information comprises generating metadata responsive to determining that the mobile device has received the installation recommendation;

wherein the metadata is based on the installation history and indicative of at least one of: the location of the mobile device, a time, a weather condition, an ambient noise level, an available bandwidth, a computing cost of an acquisition of the installation recommendation, a business identification, and an estimated time to install the recommended application.

16. The non-transitory computer-readable storage medium of claim 14, wherein the application installation queue comprises an ordered list of a plurality of installation recommendations for an application installation, wherein the method further includes rearranging the installation queue.

17. The non-transitory computer-readable storage medium of claim 16, wherein rearranging the installation queue comprises installing one or more application installation recommendations from the ordered list of the plurality of application installation recommendations.

* * * * *